US005512020A

United States Patent [19]

Yasui et al.

[11] Patent Number: 5,512,020

[45] Date of Patent: Apr. 30, 1996

[54] BELT MEANDERING PREVENTING SYSTEM IN SINGLE FACER

[75] Inventors: Toshihiko Yasui, Owariasahi; Kazuhiro Hatasa, Ena, both of Japan

[73] Assignee: Kabushiki Kaisha Isowa, Aichi, Japan

[21] Appl. No.: 435,217

[22] Filed: May 5, 1995

[30] Foreign Application Priority Data

May 16, 1994 [JP] Japan .................................... 6-126764

[51] Int. Cl.[6] .............................. F16H 55/12; B31F 1/00

[52] U.S. Cl. ............................................ 474/151; 156/473

[58] Field of Search .................................... 474/101, 102, 474/103, 151; 156/462, 472, 473

[56] References Cited

U.S. PATENT DOCUMENTS

| | | | |
|---|---|---|---|
| 2,720,910 | 10/1955 | Rockstrom et al. | 156/472 |
| 4,169,007 | 9/1979 | Pray | 156/380 |
| 4,655,870 | 4/1987 | Mori et al. | 156/285 |
| 4,814,038 | 3/1989 | Hayashi et al. | 156/472 X |
| 5,116,448 | 5/1992 | Murayama et al. | 156/472 X |
| 5,160,400 | 11/1992 | Thomas | 156/382 |
| 5,344,520 | 9/1994 | Seki et al. | 156/472 |

*Primary Examiner*—Roger J. Schoeppel
*Attorney, Agent, or Firm*—Koda and Androlia

[57] ABSTRACT

Disclosed is a belt meandering preventing system in a single facer consisting of an upper fluted roll, a lower fluted roll, a gluing mechanism, and an application mechanism having an endless belt extended over a plurality of rolls so as to be able to run freely thereby in which a liner is pressed against the glued crests of corrugation of a corrugating medium to be pasted therewith to form a single-faced corrugated board, characterized in that a support shaft on which one of the plurality of rolls is rotatably fitted is designed to be swung on one end portion thereof as a fulcrum by operating a drive means, thus preventing securely meandering of the endless belt using the system having such simple structure and also reducing the production cost and the size of the single facer.

4 Claims, 10 Drawing Sheets

BELT MEANDERING PREVENTING SYSTEM IN SINGLE FACER

BACKGROUND OF THE INVENTION

1. Field of the Invention

This invention relates to a system for preventing crosswise meandering of an endless belt extended over a group of rolls in a single facet which produces a single-faced corrugated board by nipping a corrugating medium and a liner between a lower fluted roll and the endless belt extended over a plurality of rolls so as to paste them together.

2. Description of the Related Art

In a system for forming a single-faced corrugated board (so-called single facer), an upper fluted roll and a lower fluted roll each having wavy flutes formed on the circumference are rotatably supported between frames in a vertical relationship in such a way that they may engage with each other by their flutes, and a press roll is designed to be brought into press contact with the lower fluted roll via a corrugating medium and a liner which are the webs of the single-faced corrugated board. Namely, the corrugating medium, which is fed between the upper fluted roll and the lower fluted roll, is allowed to have a predetermined corrugation (flutes) when it passes between these rolls. A starchy glue is applied to the crests of corrugation thus formed by a gluing roll provided in a gluing mechanism. Meanwhile, the liner being fed from the side opposite to the corrugating medium via the press roll is pressed against the glued crests of the corrugating medium between the press roll and the lower fluted roll to be pasted together and form a single-faced corrugated board. The press roll employed in the conventional single facer is of a large-diameter metallic roll which is normally urged toward the lower fluted roll so as to apply a predetermined nip pressure to the corrugating medium and liner passing between these rolls. Since flutes consisting of continuous alternative repetition of crests and troughs are formed at a predetermined pitch on the circumference of the lower fluted roll, the rotation center of the lower fluted roll and that of the press roll shift slightly as the point of press contact therebetween shifts from the trough to the crest or vice versa. Thus, as the result that the rotation centers of these rolls make cyclic reciprocating motions to be closer to or farther from each other as they rotate, great vibration and big noise are generated during formation of the single-faced corrugated board, causing the working environment in the plant to be worsened considerably. Besides, since both the press roll and the lower fluted roll are made of rigid metallic materials, an impact is periodically applied to the press roll (so-called the hammer phenomenon) every time the crests of the lower fluted roll are abutted against the press roll. Accordingly, linear press marks corresponding to the pitch of the crests of the lower fluted roll are formed horizontally on the surface of the liner in the thus formed single-faced corrugated board, disadvantageously.

As a countermeasure for the problems described above, it is proposed to use an endless belt in place of the metallic press roll so as to nip the corrugating medium and the liner in cooperation with the lower fluted roll. More specifically, the endless belt, which is extended over a plurality of rolls to run freely, is disposed adjacent to the lower fluted roll, and the corrugating medium and the liner passing between the lower fluted roll and the endless belt are adapted to be nipped therebetween and pasted together by bringing the endless belt closer to the outer surface of the lower fluted roll. Thus, the use of the endless belt can prevent generation of great vibration and big noise and also formation of press marks on the single-faced corrugated board.

In the single facer employing an endless belt described above, the endless belt and the lower fluted roll must be abutted against each other parallelwise over the full length (in the axial direction of the roll), so that it is impossible to form crowns on the rolls over which the belt is extended. However, it is extremely difficult to form an endless belt having a uniform thickness and a uniform inner peripheral size over the full width thereof, and most of such belts involve minor errors. Accordingly, such endless belt extended over the group of uncrowned rolls tends to undergo crosswise biasing or meandering due to the errors inherent in itself to be displaced from the bonding zone where the corrugating medium and the liner are pasted together, causing defective pasting therebetween.

Under such circumstances, it is proposed to prevent meandering of the endless belt extended over the group of rolls by shifting the axes of these rolls to slightly cross each other. However, since the direction of meandering, the meandering stroke, etc. due to the errors and the like inherent in the endless belts vary one by one, the biasing direction and the biasing amount of these rolls must be adjusted every time the belt is replaced. Namely, each roll must be provided with an adjusting mechanism, making the structure of the single facet complicated and also leading to cost elevation, disadvantageously. It can also be pointed out that the spaces for disposing the respective adjusting mechanisms must be secured, and thus the size of the single facer is enlarged. Besides, adjusting operations are required every time the endless belt is replaced to increase the loss time, causing reduction of production efficiency. Incidentally, meandering of belt can happen during running due to changes in the operational conditions, abrasion of the belt, etc., even if adjustment of rolls is duly performed before starting the single facet.

In such cases, the operation of the single facer must be stopped to make readjustment, causing again reduction in the production efficiency.

This invention is proposed in view of the problems inherent in the prior art described above and in order to solve them successfully, and it is an objective of the invention to provide a system for preventing meandering of an endless belt in a single facet, which has a simple structure and can securely prevent meandering of the endless belt.

SUMMARY OF THE INVENTION

In order to solve the above problems and attain the intended object of the invention successfully, there is provided a belt meandering preventing system in a single facer consisting of an upper fluted roll having flutes formed on the circumference thereof; a lower fluted roll, also having on the circumference thereof flutes which are engaged with those of the upper fluted roll to form a predetermined corrugation on a corrugating medium passed between the upper fluted roll and the lower fluted roll; a gluing mechanism for gluing the crests of corrugation in the corrugating medium; and an application mechanism which is disposed adjacent to the lower fluted roll and equipped with an endless belt extended over a plurality of rolls so as to be able to run freely thereby; in which a liner is pressed against the glued crests of corrugation of the corrugating medium fed along the circumference of the lower fluted roll to be pasted with the corrugating medium and form a single-faced corrugated board; characterized in that a support shaft on which one of the plurality of rolls is rotatably fitted is designed to be swung on one end portion thereof as a fulcrum by operating a drive means.

BRIEF DESCRIPTION OF THE DRAWINGS

The features of this invention that are believed to be novel are set forth with particularity in the appended claims. The invention, together with the objects and advantages thereof, may best be understood by reference to the following description of the preferred embodiment taken in conjunction with the accompanying drawings in which:

DETAILED DESCRIPTION OF THE PREFERRED EMBODIMENTS

The belt meandering preventing system in a single facer according to this invention will now be described by way of preferred embodiments referring to the attached drawings.

(General constitution of single facer in which belt meandering preventing system according to the first embodiment is employed)

Figure 1:
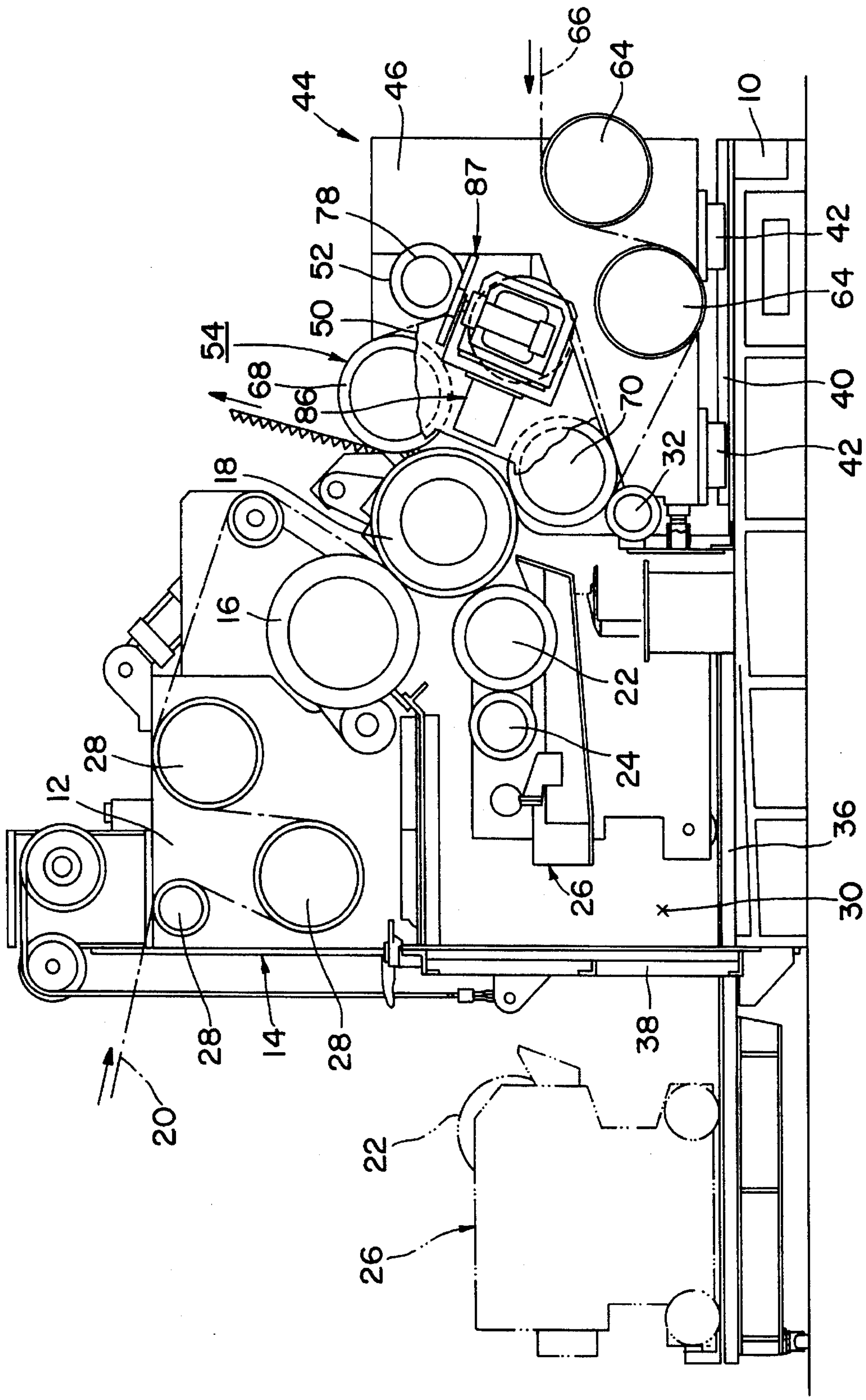
FIG. 1 shows schematically a constitution of a single facer employing a belt meandering preventing system according to a first embodiment of the invention.

As shown in FIG. 1, a main body 14 of the single facer is disposed on a base 10 installed on the floor of a plant. The single facer consists of a pair of opposing fixed frames 12 (only one frame is shown) arranged to be spaced from each other (one on the drive side and the other on the operational side) on the line orthogonal to the direction of feeding a corrugating medium 20, and an upper fluted roll 16 having flutes formed on the circumference thereof and a lower fluted roll 18 also having flutes formed on the circumference thereof, which are rotatably supported between these frames 12. The rotary shaft of the upper fluted roll 16 locates diagonally above that of the lower fluted roll 18, and the flutes of the upper fluted roll 16 are designed to be engageable with those of the lower fluted roll 18 via the corrugating medium 20. Meanwhile, a gluing mechanism 26 consisting of a gluing roll 22 and a doctor roll 24 is disposed immediately below the upper fluted roll 16 and diagonally below the lower fluted roll 18. The corrugating medium 20 is fed from a web feeding source (not shown) which is assumed to locate on the left side in FIG. 1, via a plurality of guide rolls 28, to the engagement zone defined between the upper fluted roll 16 and the lower fluted roll 18 to be provided with a predetermined corrugation by passing the engagement zone. The thus corrugated corrugating medium 20 is glued at the crests by the gluing mechanism 26 and then diverted upward along the circumference of the lower fluted roll 18.

Figure 2:
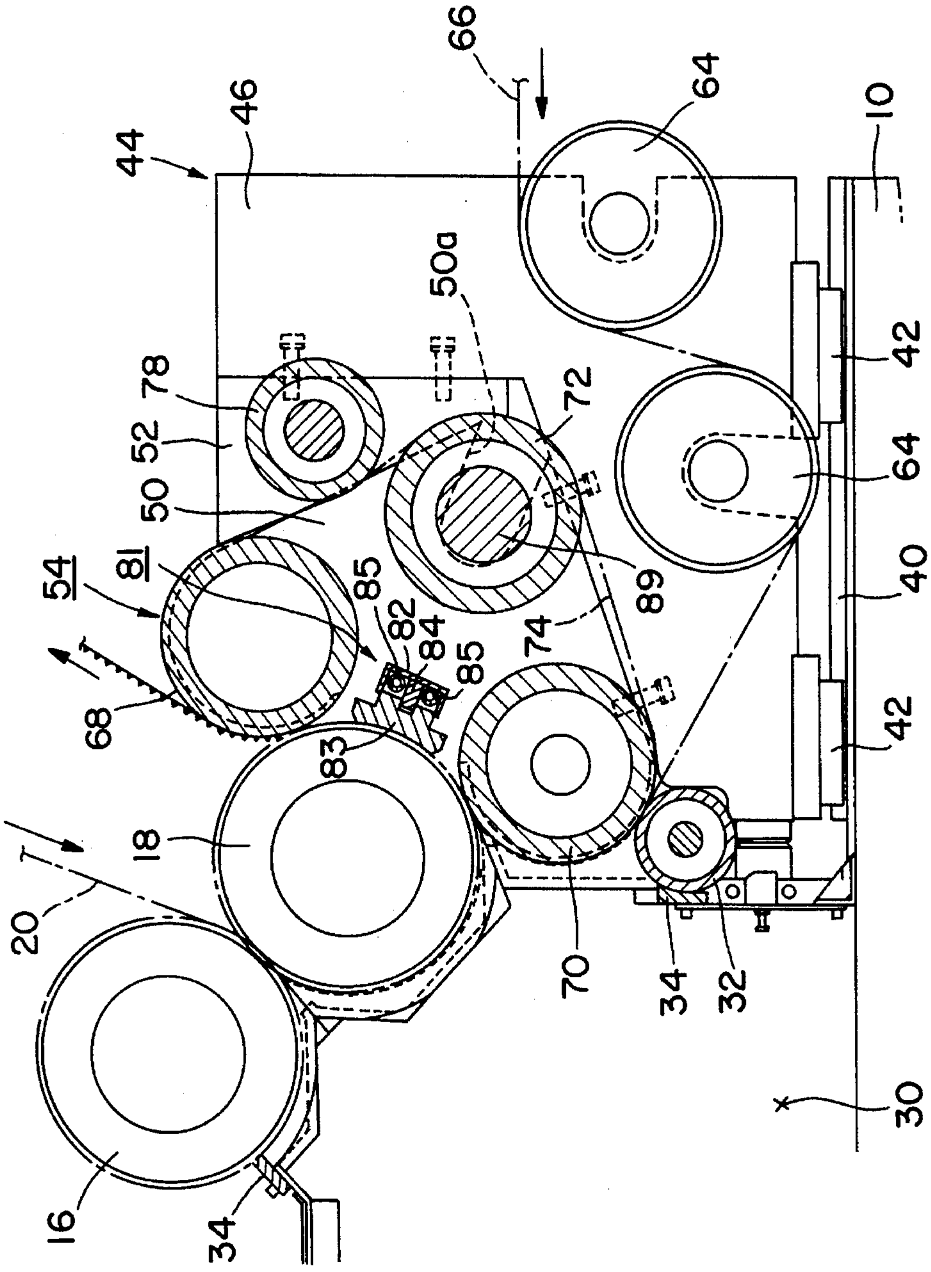
FIG. 2 shows schematically a cross-sectional view of the major section of the single facet according to the embodiment.

It should be noted here that a pressure chamber 30, in which the gluing mechanism 26 is to be housed, is defined immediately below the upper fluted roll 16 and diagonally below the lower fluted roll 18. The pressure chamber 30 is open toward the upper fluted roll 16 and the lower fluted roll 18. As shown in FIG. 2, sealing members 34 are interposed between the opening of the pressure chamber 30 and the upper fluted roll 16 and between the opening and a seal roll 32 disposed immediately below the lower fluted roll 18 along the axes thereof, respectively, so that the pressure chamber 30 may be maintained substantially airtight. A compressed air is fed from a source (not shown) to the pressure chamber 30 so as to maintain the inside of the chamber 30 to be slightly higher than the atmospheric pressure (e.g. by 0.15 atm). In this case, the outer circumference of the lower fluted roll 18 facing the pressure chamber 30 is assuming the atmospheric pressure by virtue of the circumferential grooves (not shown) defined at predetermined intervals in the axial direction. Accordingly, the corrugating medium 20 corrugated by passing between the upper fluted roll 16 and the lower fluted roll 18 can be fed stably as pressed against the roll surface due to the difference between the pressure in the pressure chamber 30 and that on the circumference of the lower fluted roll 18.

Incidentally, the gluing mechanism 26 is disposed to be slidable along rails 36 laid on the bottom (base 10) of the pressure chamber 30, so that the gluing mechanism 26 can be carried out from the pressure chamber 30 along the rails 36 by opening a door 38 disposed on the left side of the pressure chamber 30 shown in FIG. 1.

A pair of guide rails 40 (only one guide rail is shown) spaced from each other on the drive side and the operational side are laid on the base 10 at the portion extending rightward (at the position closer to the lower fluted roll 18) than the location of the main body 14, as shown in FIG. 1, and a movable body 44 is disposed on these guide rails 40 to be slidable via corresponding sliders 42. The movable body 44 can be moved along the guide rails 40 to be closer to or farther from the main body 14 by operating a hydraulic cylinder (not shown) provided on the base 10 in the positive or negative direction. The movable body 44 consists of a pair of movable frames 46 disposed separately on the drive side and operational side and opposing to each other, a pair of split frames 50 and a pair of auxiliary frames 52, which are fixed by a plurality of bolts 48 to the movable frames 46, respectively. A primary application mechanism 54 is disposed between the split frames 50 opposing to each other. A couple of roll-like preheaters 64 are disposed between the movable frames 46, as shown in FIG. 1. The liner 66 fed from a web feeding source (not shown) assumed to locate on the right side of FIG. 1 is fed via the preheaters 64 to the lower fluted roll 18 to be pasted with the corrugating medium 20 at the glued crests of corrugation and fed upward.

The application mechanism 54 for pasting the corrugating medium 20 with the liner 66 in cooperation with the lower fluted roll 18 is disposed between the split frames 50. Namely, a drive roll 68 and a preheating roll 70 are rotatably supported between the split frames 50 on the side closer to the lower fluted roll 18 and spaced from each other along the tangential line of the lower fluted roll 18, as shown in FIG. 2. A tension roll 72 is also rotatably supported between the split frames 50 on the side farther from the lower fluted roll 18, and an endless belt 74 is extended over these three rolls 68,70,72 all supported between the split frames 50. The portion of the endless belt 74 running between the drive roll 68 and the preheating roll 70 is designed to be brought closer to the circumference of the lower fluted roll 18 to nip the corrugating medium 20 being fed along the circumference of the lower fluted roll 18 and the liner 66 to be pasted therewith in cooperation with the lower fluted roll 18. The preheating roll 70 locating at a lower position between the seal roll 32 and the lower fluted roll 18 is abutted against these rolls 32,18 via the endless belt 74. Thus, the opening of the pressure chamber 30 is blocked by the upper fluted roll 16, lower fluted roll 18, preheating roll 70 and the seal roll 32. Incidentally, a seamless resin belt is preferably used as the endless belt 74. The drive roll 68 is connected to a drive source (not shown) of the single facer via a universal joint (not shown) to be rotated thereby, so as to drive the endless belt 74 to run at a predetermined speed synchronously with the upper fluted roll 16 and the lower fluted roll 18. It should be noted here that, since the drive roll 68 and the drive source are connected by the universal joint, the movable body 44 is allowed to be moved closer to or farther from the main body 14. Meanwhile, the preheating roll 70 is connected to a high-temperature steam source (not shown), which distributes a high-temperature steam into the roll so as to heat the roll surface to a predetermined temperature. The liner 66 is heated via the endless belt 74 extended over the preheating roll 70 so as to achieve secured bonding with the corrugating medium 20. Further, the tension roll 72 is disposed to be movable in the radial direction of the lower fluted roll 18 with respect to the split frames 50, so that the tension roll 72 may be moved closer to or farther from the lower fluted roll 18 by a pair of hydraulic cylinders 76 (to be described later) along the tension applying direction to adjust the tension to be applied to the endless belt 74.

A secondary application mechanism 81 is disposed to oppose to the lower fluted roll 18 via the endless belt 74 abutted against the liner 66 fed along the circumference of the lower fluted roll 18. The secondary application mechanism 81 compensates for the insufficiency in the bonding between the corrugating medium 20 and the liner 66 achieved by the primary application mechanism 54. This secondary application mechanism 81 consists of a housing 82 having a U-shaped cross section and extending parallel to the lower fluted roll 18, and a pressing member 83 which is disposed in the housing 82 to be movable in the radial direction of the lower fluted roll 18, as shown in FIG. 2. This pressing member 83 is substantially as wide as the entire length of the lower fluted roll 18 and has a predetermined length in the circumferential direction of the roll 18. That surface of the pressing member 83 which opposes to the lower fluted roll 18 is arcuated after the circumference of the roll 18. A partition 84 is disposed in the housing 82, and elastically deformable tubes 85 are disposed between the inner bottom surface of the housing 82 and the bottom of the pressing member 83 in the upper space and the lower space defined by the partition 84 (on each side of the partition 84 in the circumferential direction of the lower fluted roll 18), respectively. The respective tubes 85 are extended over the entire width of the pressing member 83, and a predetermined amount of compressed air is fed from compressed air supply sources (not shown) to these tubes 85, respectively, to expand the tubes 85 and allow the pressing member 83 to be brought into press contact with the lower fluted roll 18. Incidentally, the pressing member 83 and the tubes 85 may be designed to be separated into a plurality of blocks and arranged in the axial direction of the lower fluted roll 18 or may be arranged in a plurality of rows in the circumferential direction of the roll 18. Meanwhile, referring to the material of the pressing member 83, one which is softer and has a smaller coefficient of friction than the endless belt 74 can suitably be used, because the member 83 is brought into slide contact with the rear surface of the endless belt 74.

A guide roll 78 is rotatably supported between the auxiliary frames 52 to be parallel with those three rolls 68,70,72 over which the endless belt 74 is extended. The guide roll 78 locates outer than the portion of the endless belt 74 running between the drive roll 68 and the tension roll 72. The guide roll 78 is not an essential constituent and can be omitted.

(Belt meandering preventing system and tension adjuster according to the first embodiment)

A tension adjuster 86 and a meandering preventer 87 are disposed relationally to the tension roll 72 so as to apply a predetermined tension to the endless belt 74 and press the corrugating medium 20 and the liner 66 to be pasted therewith with an appropriate contact pressure, as well as, to prevent crosswise meandering of the belt 74 (in the axial direction of the roll 72).

Figure 3:
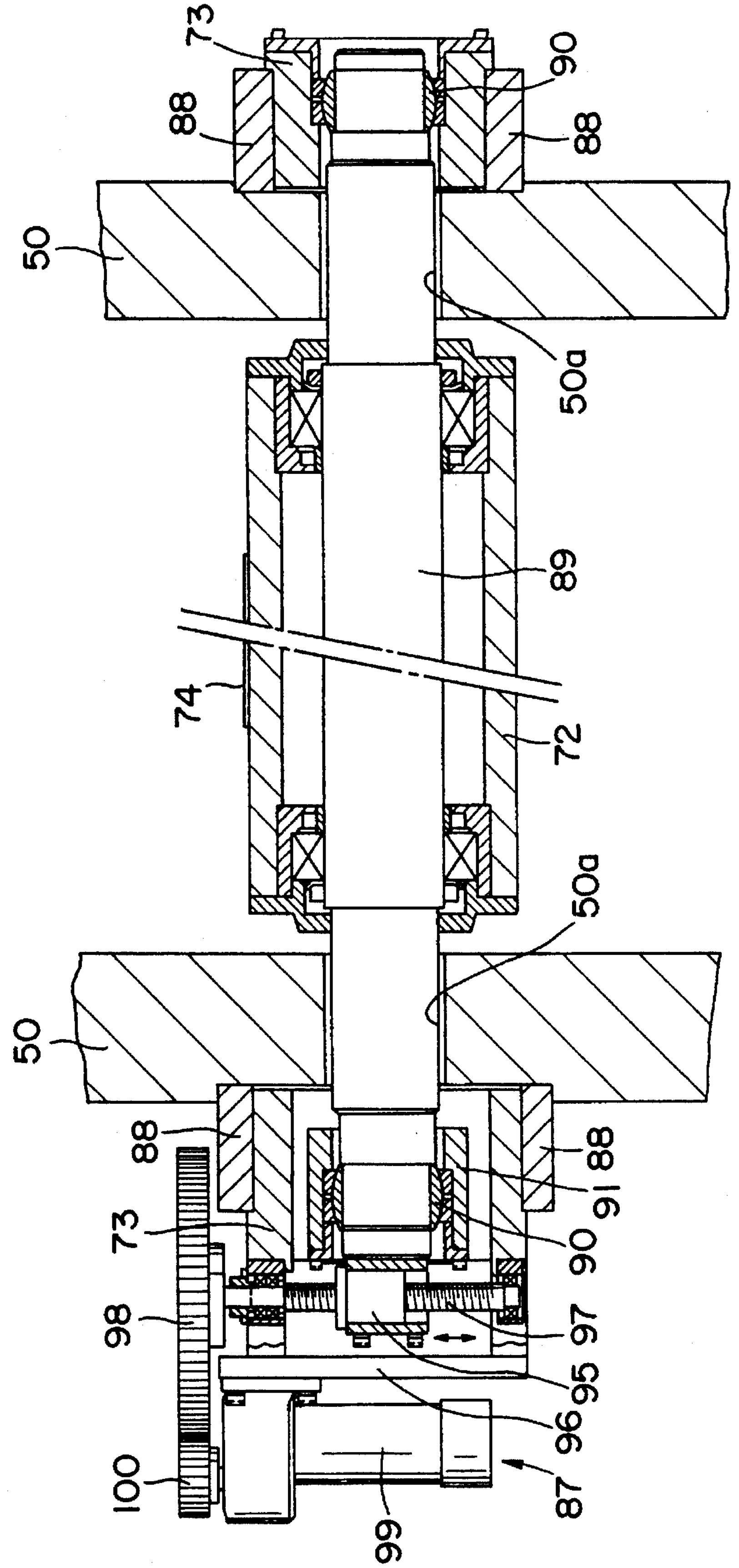
FIG. 3 shows a vertical cross-sectional view of the belt meandering preventing system according to the first embodiment of the invention.

Namely, as shown in FIG. 3, a pair of guide rails 88 are disposed on the outer surface of each split frame 50 to be spaced from each other in the direction orthogonal to the tension applying direction, and a supporting member 73 is disposed between these rails 88 to be movable in the tension applying direction. Each split frame 50 contains a slot 50*a* formed at a position between the guide rails 88 to be parallel to these rails 88, and the end portions of a support shaft 89 on which the tension roll 72 is rotatably fitted are inserted to these slots 50*a* to extend outward. The right end portion (on the drive side) of the support shaft 89 is supported such that it can swing via a spherical bearing 90 disposed on the corresponding supporting member 73; while the left end portion (on the operational side) of the support shaft 89 is also supported such that it can swing via a spherical bearing 90 disposed via a holder 91 on the corresponding supporting member 73. Incidentally, the holder 91 disposed on the left supporting member 73 is designed to be movable with respect to the supporting member 73 in the direction orthogonal to the tension applying direction (the direction orthogonal to the direction that the supporting member 73 moves). Further, the inner diameter of each slot 50*a* is designed to be greater than the portion of the support shaft 89 inserted thereto, as shown in FIG. 3, so that the support shaft 89 can swing.

Figure 4:
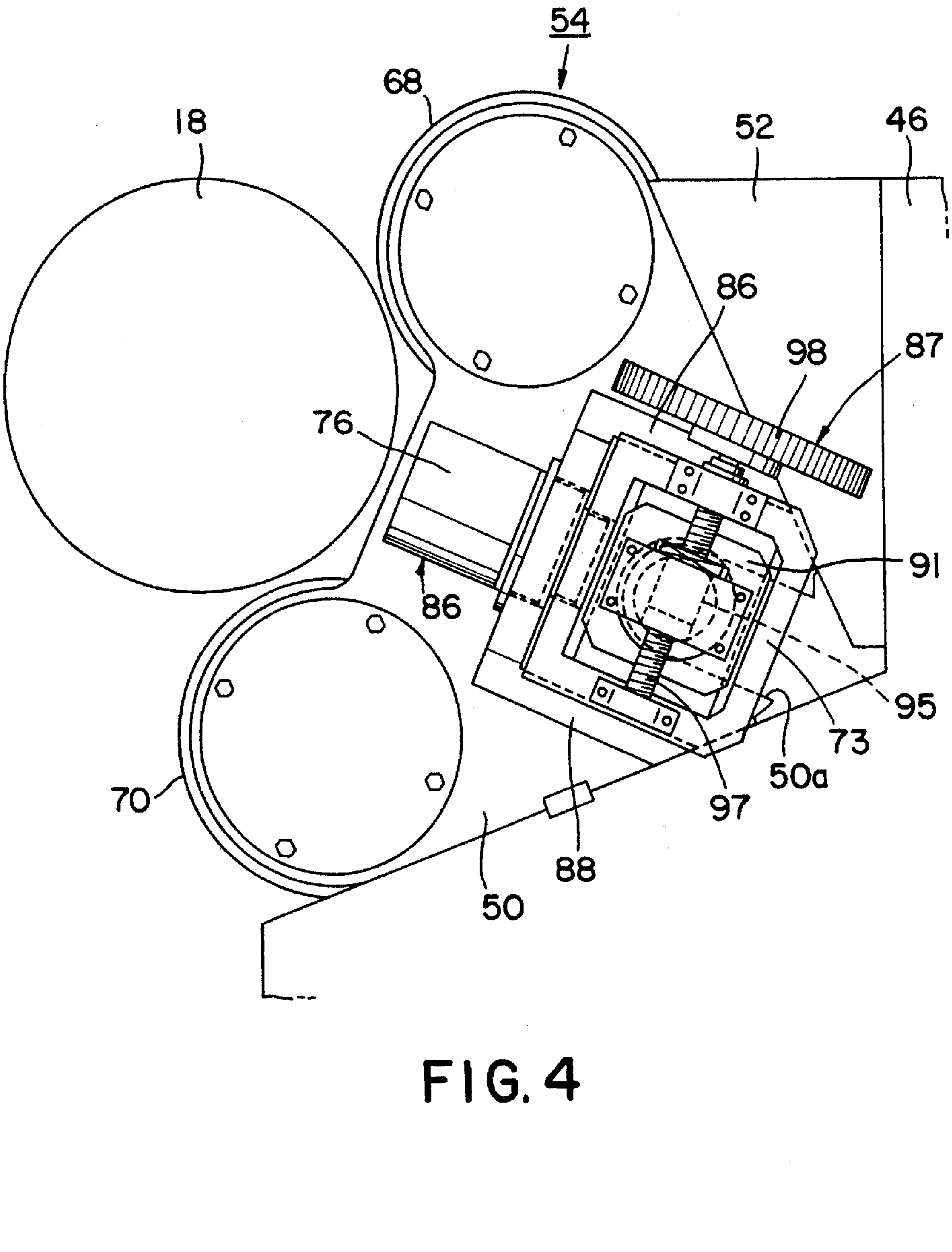
FIG. 4 shows a side view of the belt meandering preventing system according to the preferred embodiment of the invention, in which some parts are omitted.
Figure 5:
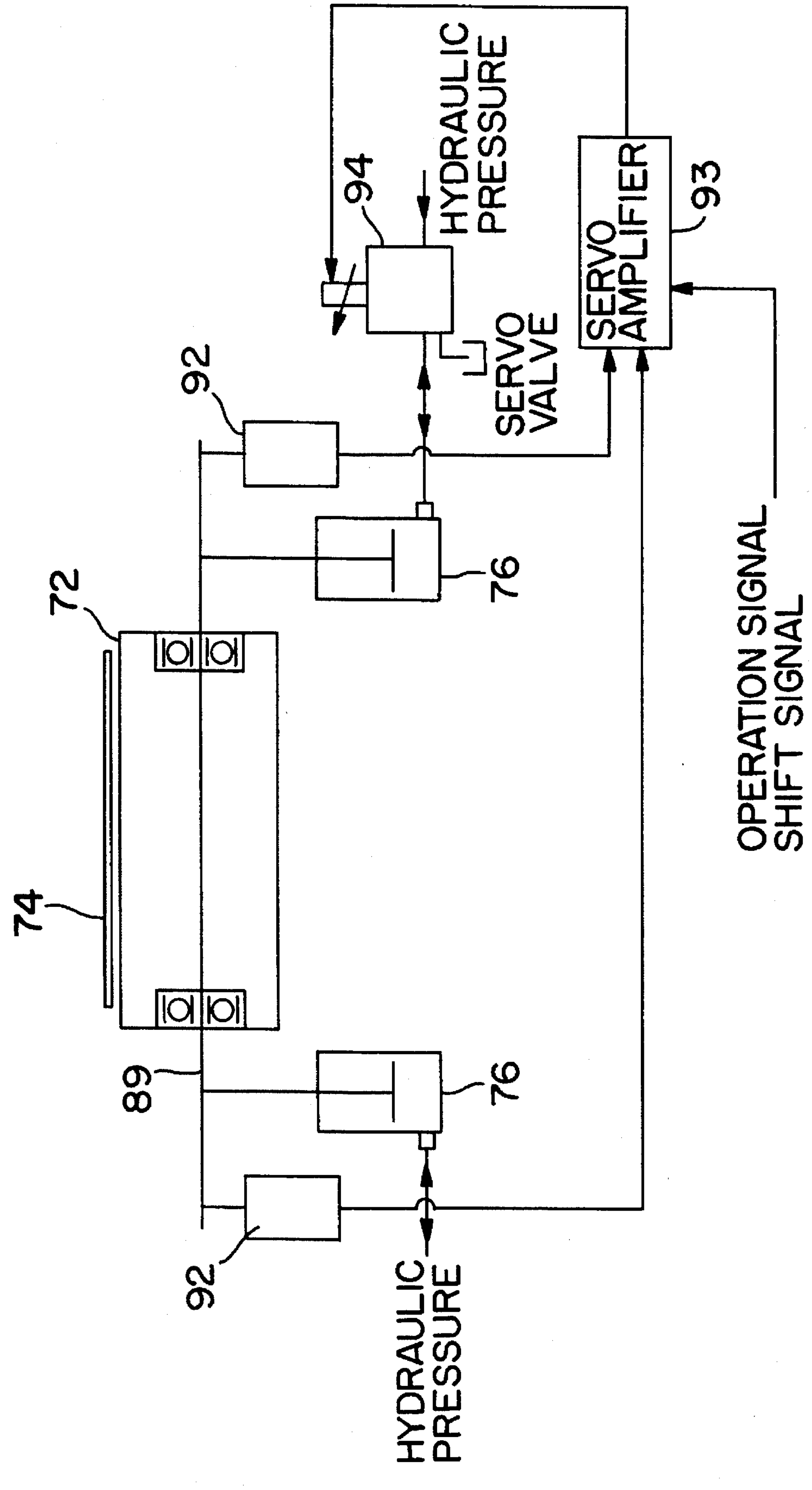
FIG. 5 shows a control block diagram of a tension adjuster to be disposed in the single facer according to the embodiment.

A hydraulic cylinder 76 is disposed on the outer side of each split frame 50, with its piston rod being connected to the supporting member 73 (see FIG. 4). Accordingly, when the pair of cylinders 76 are operated by a control mechanism shown in FIG. 5, the tension roll 72 can be moved closer to or farther from the endless belt 74 via the support shaft 89 to impart a predetermined tension to the belt 74. In the mechanism for controlling the hydraulic cylinders 76, a detection signal output from a pair of position transmitters 92 for monitoring the current position of each end of the support shaft 89 is input to a servo amplifier 93, in the state where a predetermined hydraulic pressure is supplied to the hydraulic cylinder 76 locating on the left side in FIG. 5. The servo amplifier 93 compares the detection signal from the reference position generator 92 locating on the left side with a signal from the position generator 92 locating on the right side so as to adjust the aperture of the servo valve in accordance with the detection result, followed by hydraulic control of the right hydraulic cylinder 76. Incidentally, in the hydraulic cylinder 76 in this embodiment, the tension roll 72 is designed to be positioned relative to the endless belt 74 at three points based on the operation signals and shift signals input to the servo amplifier 93: a position where a required tension is designed to be applied to the endless belt 74 to securely achieve bonding of the corrugating medium 20 with the liner 66; a position where a very small tension is applied to the endless belt 74 extended over the three rolls 68,70,72 to be slackless; and a position where the endless belt 74 is slackened to be releasable from the rolls 68,70,72 in the axial direction. Since the outer peripheral size of each split frame 50 is designed to be smaller than the inner circumferential size of the endless belt 74, the endless belt 74 can be withdrawn from the three rolls 68,70,72 in the axial direction without detaching the split frame 50.

As shown in FIG. 3, a nut 95 is fixed to the left end of the support shaft 89 to be movable integrally therewith, and a screw shaft 97 rotatably supported on a bracket 96 disposed on the supporting member 73 is screwed into the nut 95. A gear 98 is disposed on the outer end portion of the screw shaft 97 extending out of the bracket 96 to be rotatable integrally with the screw shaft 97, and engaged with another gear 100 attached to the output shaft of a stepping motor 99 mounted on the bracket 96. Accordingly, if the motor 99 is driven in the positive or negative direction, the support shaft 89 is swung on the right end side thereof under the action of the nut 95 and the screw shaft 97 screwed therein. Incidentally, it is possible to use a servo motor in place of the stepping motor 99.

Figure 6:
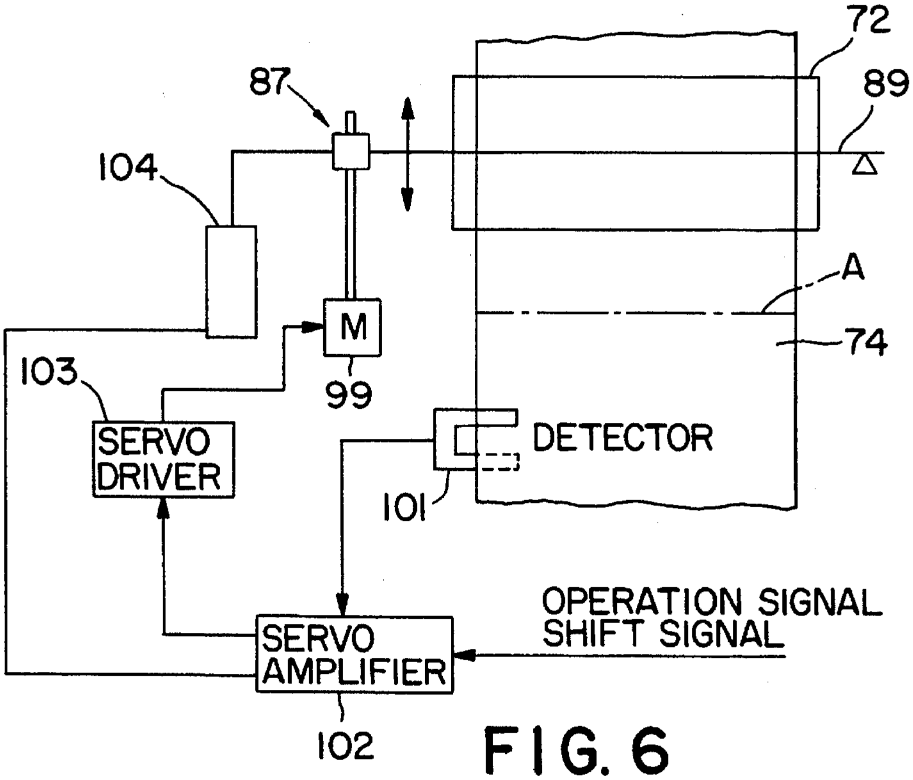
FIG. 6 is a control block diagram of the belt meandering preventing system according to the first embodiment of the invention.

A detector 101 such as a photoelectric tube is disposed on the running route of an edge of the belt 74, as shown in FIG. 6. The detector 101 detects meandering of the endless belt 74, and detection signals from the detector 101 may be input to a servo amplifier 102. The servo amplifier 102 compares the reference position of the endless belt 74 extended over the tension roll 72 and the current position of the endless belt 74 detected by the detector 101, and the stepping motor 99 is driven under control via a servo driver 103 in accordance with the comparison result. Namely, since the endless belt 74 meanders crosswise due to the errors inherent in itself, as described above, such meandering is detected by the detector 101 to actuate the meandering preventer 87 to control swinging of the tension rolls 72 in the meandering regulating direction (which is preset based on experiments and the like). Thus, the endless belt 74 extended over the tension roll 72 is prevented from meandering and can run constantly along a predetermined zone. In other words, the endless belt 74 is prevented from deviating from the bonding zone where the corrugating medium 20 is pasted with the liner 66 (the zone corresponding to the width of the corrugating medium 20 and of the liner 66) to achieve secured bonding therebetween. Incidentally, a position generator 104 for detecting the current position of one end (swinging side) of the support shaft 89 is disposed so as to input signals from the generator 104 to the servo amplifier 102.

(Working of the embodiment)

Next, working of the meandering preventer in a single facer according to the embodiment described above will be described. During operation of the single facer according to the embodiment, the tension roll 72 is urged by the hydraulic cylinders 76 to apply a predetermined tension to the endless belt 74 extended over the three rolls 68,70,72 of the primary application mechanism 54. Accordingly, the portion of the endless belt 74 running between the drive roll 68 and the preheating roll 70 is brought closer to the lower fluted roll 18 to bring the corrugating medium 20 and liner 66 fed along the circumference of the lower fluted roll 18 into press contact with the surface of the roll 18. Meanwhile, compressed air is fed to the tubes 85 in the secondary application mechanism 81, so that the endless belt 74 is brought into press contact with the corrugating medium 20 and liner 66 over the entire width thereof by the pressing member 83. Thus, the corrugating medium 20 and liner 66 are nipped over a predetermined width between the lower fluted roll 18 and the endless belt 74 to be bonded together securely at the glued portions.

If the endless belt 74 meanders crosswise due to the errors inherent in itself and the like, the detector 101 detects such meandering, and the detection signal is input to the servo amplifier 102 to control driving of the stepping motor 99 via the servo driver 103. Namely, the motor 99 is driven in the positive or negative direction to rotate the screw shaft 97 via the gears 100,98 to move the nut 95 engaged with the shaft 97, and thus the support shaft 89 is allowed to swing in the direction orthogonal to the tension applying direction on the right end side thereof as a fulcrum. Thus, the tension roll 72 is swung in the same direction to allow the endless belt 74 to stop meandering and to return to the reference position. It should be noted here that, if the endless belt 74 deviates from the reference position due to the swinging of the tension roll 72, such deviation is detected by the detector 101 to drive the stepping motor 99 in the opposite direction and allow the tension roll 72 to swing in the opposite direction, and thus the meandering of the belt 74 can be prevented. As described above, meandering of the endless belt 74 can be detected by the detector 101 to allow the belt 74 to locate constantly at the reference position(the bonding zone where the corrugating medium 10 is pasted with the liner 66), and they can securely be bonded together. Further, such meandering of the endless belt 74 can be prevented by allowing the support shaft 89 to swing a very little (about 0.2 mm).

(Second embodiment)

Figure 9:
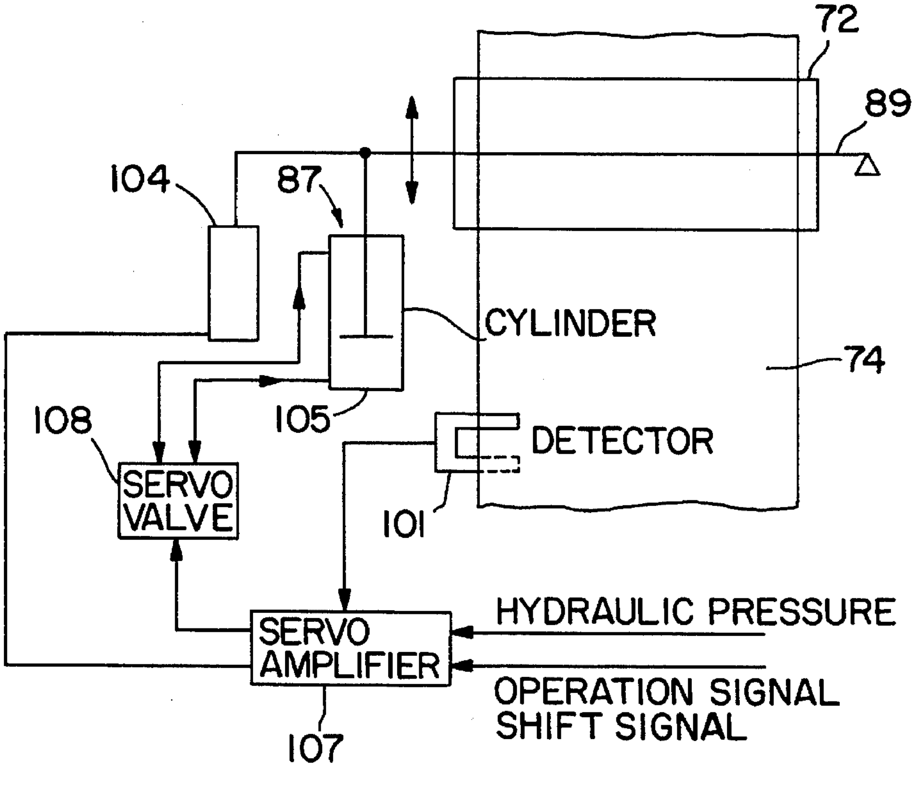
FIG. 9 is a control block diagram of the belt meandering preventing system according to the second embodiment of the invention.
Figure 7:
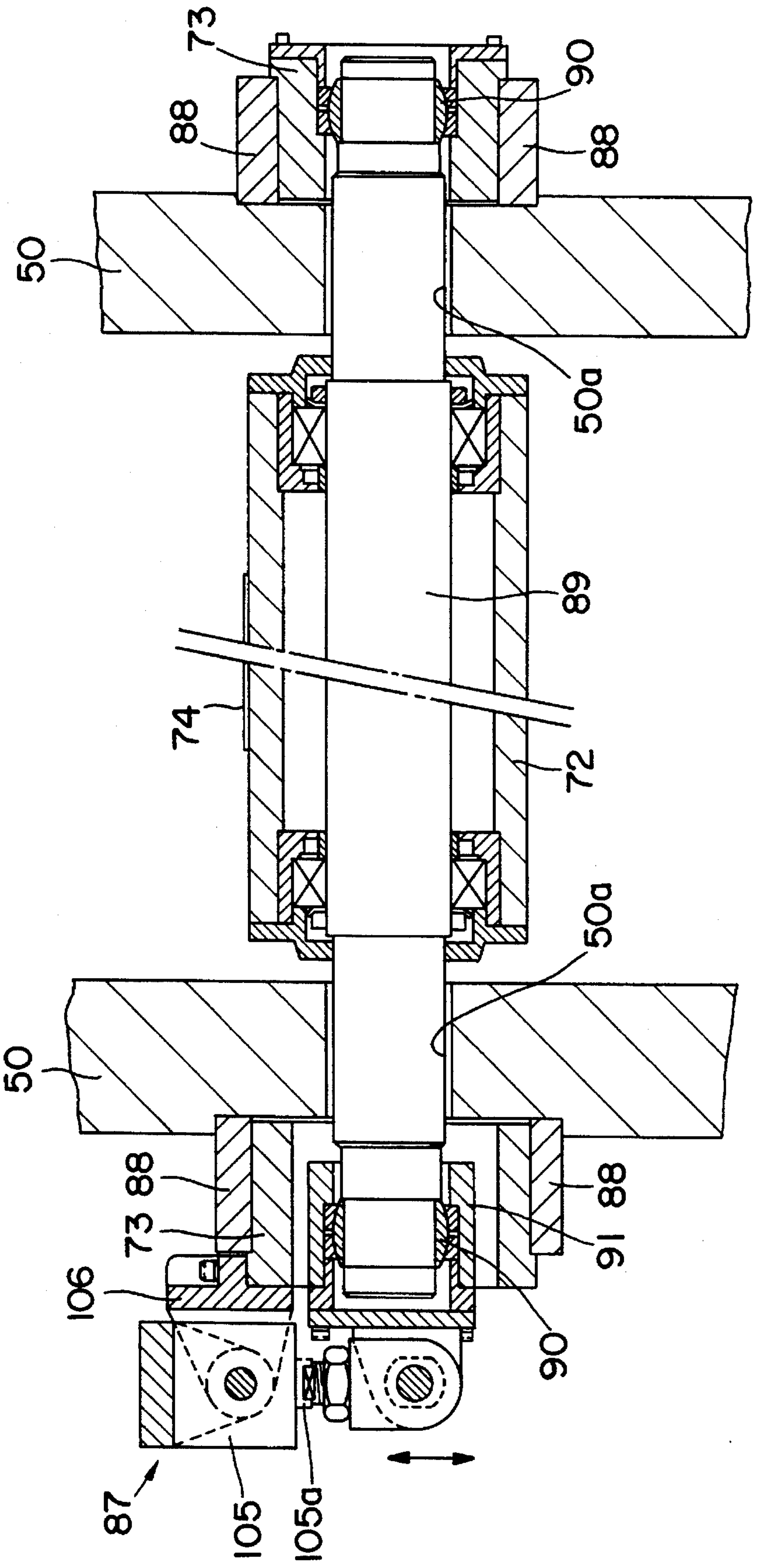
FIG. 7 shows a vertical cross-sectional view of the belt meandering preventing system according to a second embodiment of the invention.
Figure 8:
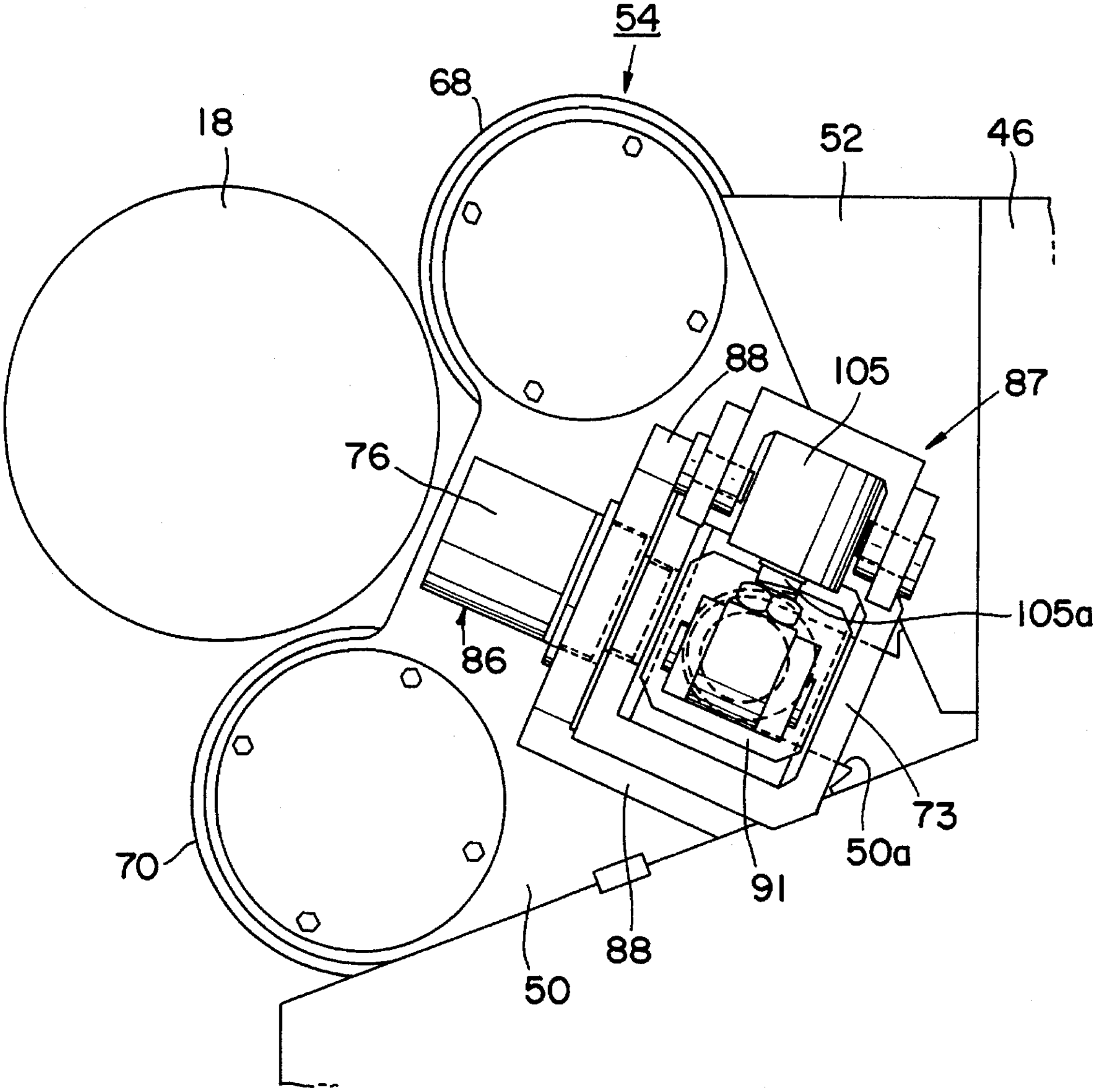
FIG. 8 shows a side view of the belt meandering preventing system according to the second embodiment of the invention.

FIGS. 7 and 8 show a second embodiment of the meandering preventer 87, in which the support shaft 89 is designed to be swung by a double action hydraulic cylinder 105. More specifically, the hydraulic cylinder 105 is trunnion-mounted invertedly via a bracket 106 to the supporting member 73 supporting therein the left end portion of the support shaft 89, and its piston rod **105*a* is brought into crevice-connection to the holder 91 of the spherical bearing 90. It should be appreciated that the hydraulic cylinder 105 is controlled by a control mechanism shown in FIG. 9, and the basic constitution of the mechanism is the same as in the first embodiment. Namely, a detection signal from the detector 101, which detects an edge of the endless belt 74, is input to a servo amplifier 107, where comparison between the reference position and the current position is carried out. Based on the comparison result, a servo valve 108 is controlled to be let open or closed and operate the hydraulic cylinder 105 in the positive or negative direction. When the hydraulic cylinder 105 is operated, the holder 91 is moved relative to the supporting member 73 to swing the support shaft 89 on the right end side thereof as a fulcrum, in turn to swing the tension roll 72 fitted on the support shaft 89 in the direction orthogonal to the tension applying direction, and thus the belt 74 can be prevented from meandering. Incidentally, the hydraulic cylinder 105** may be replaced with a single action hydraulic cylinder or an air cylinder.

(Variations of meandering preventer)

While the tension adjuster 86 and the meandering preventer 87 are relationally disposed to the tension roll 72 in the first and second embodiments described above, the present invention is not limited to such constitution. For example, only the tension adjuster 86 may relationally be disposed to the tension roll 72, and the meandering preventer 87 may relationally be disposed to the drive roll 68 or preheating roll 70 so as to swing these rolls 68,70. Further, it is also possible to dispose the meandering preventer 87 to the guide roll 78. As the mechanism for swinging the support shaft 89, a mechanism consisting of a rack and a pinion, etc. or other means can suitably be selected and used in place of the nut and screw shaft. It should be noted here that the detector 101 used in the above embodiment is directed to find out meandering of the endless belt 74 by detecting one edge thereof. However, for example, a pair of detectors provided with a plurality of parallel photoelectric tubes may be disposed on the running routes of the right and left edges of the belt 74, and meandering of the belt 74 on the right side and left side thereof may be detected by these two detectors. Since the axis of the roll on which the meandering preventer 87 is disposed, assuming a parallel posture with respect to the crosswise reference line A (see FIG. 6) of the belt 74, may be slanted in the required direction in order to prevent meandering of the endless belt 74, the direction of swinging the roll is not limited to the direction orthogonal to the tension applying direction, but the roll can be slanted in other directions with respect to the tension applying direction.

(Variations of single facer)

Figure 10:
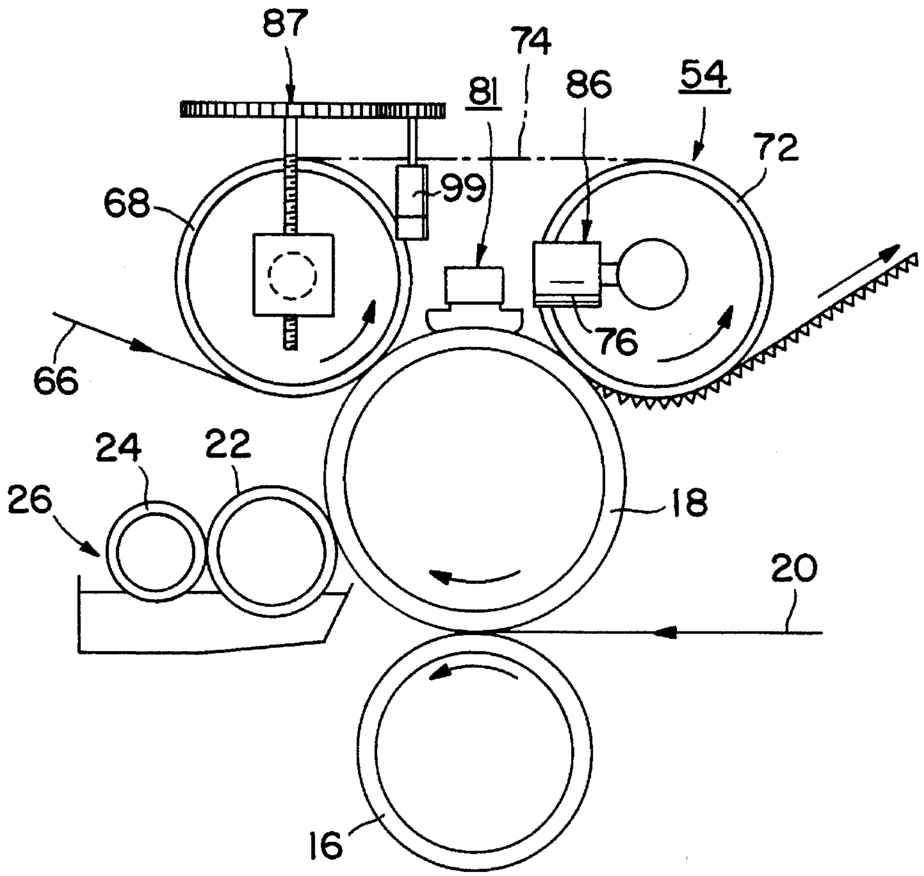
FIG. 10 shows schematically the constitution of a variation of the single facer according to the embodiment.

FIG. 10 shows schematically a variation of the single facer in which the belt meandering preventing system according to this invention is employed, in which the arrangement of the upper fluted roll 16 and the lower fluted roll 18 is different from that in the above-described embodiment. More specifically, the lower fluted roll 18 is rotatably supported immediately above the upper fluted roll 16 rotatably supported on the main body 14, and the flutes of the upper fluted roll 16 are designed to be engageable with those of the lower fluted roll 18 via the corrugating medium 20. The gluing mechanism 26 consisting of a gluing roll 22 and a doctor roll 24 is disposed diagonally below the lower fluted roll 18. The corrugating medium 20 is fed to the engagement zone defined between the upper fluted roll 16 and the lower fluted roll 18 from a web feeding source (not shown) assumed to locate on the right side of FIG. 10, and corrugated as desired by passing through this zone. The thus corrugated corrugating medium 20 is glued at the crests of corrugation by the gluing mechanism 26 and then diverted upward along the circumference of the lower fluted roll 18. Meanwhile, the liner 66 is fed to the lower fluted roll 18 from a web feeding source (not shown) assumed to locate on the left side of FIG. 10 to be pasted onto the glued crests of corrugation of the corrugating medium 20 and fed upward.

A primary application mechanism 54 consisting of a drive roll 68, a tension roll 72 and an endless belt 74 extended over these rolls 68,72 is disposed above the lower fluted roll 18, and the portion of the belt 74 running between these two rolls 68,72 is brought closer to the circumference of the lower fluted roll 18, and the corrugating medium 20 and the liner 66 to be pasted therewith fed along the circumference of the lower fluted roll 18 are adapted to be nipped between that portion of the endless belt 74 and the lower fluted roll 18. Incidentally, the liner 66 is fed to the bonding zone, where it is pasted with the corrugating medium 20, along the circumference of the drive roll 68 via the endless belt 74. A secondary application mechanism 81 of the same constitution as used in the above-described embodiment is disposed to oppose to the lower fluted roll 18 via the endless belt 74 abutted against the liner 66 fed along the circumference of the lower fluted roll 18.

The tension roll 72 of the primary application mechanism 54 is designed to be moved by the tension adjuster 86 in the direction orthogonal to the running direction of the endless belt 74 to apply a predetermined tension to the belt 74. Meanwhile, the drive roll 68 is provided with the same meandering preventer 87 as described in the first embodiment and is adapted to be swung in the running direction of the endless belt 74 by driving the stepping motor 99 in the meandering preventer 87. Incidentally, since the drive roll 68 is driven to rotate integrally with its support shaft, the bearing rotatably supporting the support shaft is further rotatably supported via a spherical bearing and the like so as to move the holder of the spherical bearing. =p In the primary application mechanism 54 consisting of two rolls 68,72 and the endless belt 74 extended over these rolls 68,72, the tension adjuster 86 and the meandering preventer 87 may relationally be disposed to the tension roll 72 like in the first embodiment. It is also possible to provide a guide roll to be abutted against the outer surface of the endless belt 74, and to dispose the meandering preventer 87 to this guide roll. Further, the meandering preventer 87 according to the second embodiment may be disposed relationally to the drive roll 68 or the tension roll 72.

(Other examples of secondary application mechanism)

Figure 11:
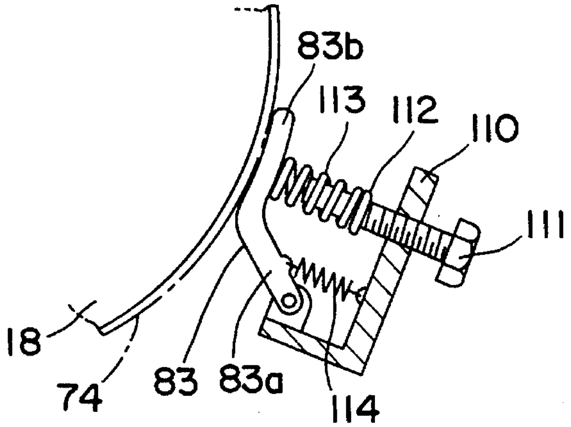
FIG. 11 shows schematically the constitution of another example of the secondary application mechanism according to the embodiment.

As the secondary application mechanism 81, another example shown in FIG. 11 can be employed. This application mechanism 81 consists of a bracket 110 fixed to the main body 14 and a V-shaped pressing member 83 with one arm 83a thereof being pivoted onto the bracket 110. The other arm 83*b* of the pressing member 83 is arcuated on the surface facing the lower fluted roll 18 after the circumferential curve of the roll 18. An adjust bolt 111 is screwed into the bracket 110, and a regulating section 112 is provided at a predetermined position of this bolt 111 extending from the bracket 110 toward the lower fluted roll 18, with a compression spring 113 being resiliently interposed between this regulating section 112 and the arm 83*b*. Namely, the arm 83*b* of the pressing member 83 is designed to be brought into press contact with the lower fluted roll 18 via the endless belt 74 in the primary application mechanism 54, liner 66 and corrugating medium 20 under the resilience of the compression spring 113. The pressure to be applied to the endless belt 74 is adjusted by moving the adjust bolt 111 with respect to the bracket 110. Incidentally, an extension spring 114 is interposed between the bracket 110 and the arm 83*a* of the pressing member 83, so that the arm 83*b* may be spaced from the endless belt 74 under the resilience of the extension spring 114, when the compression spring 113 is loosened.

Figure 12:
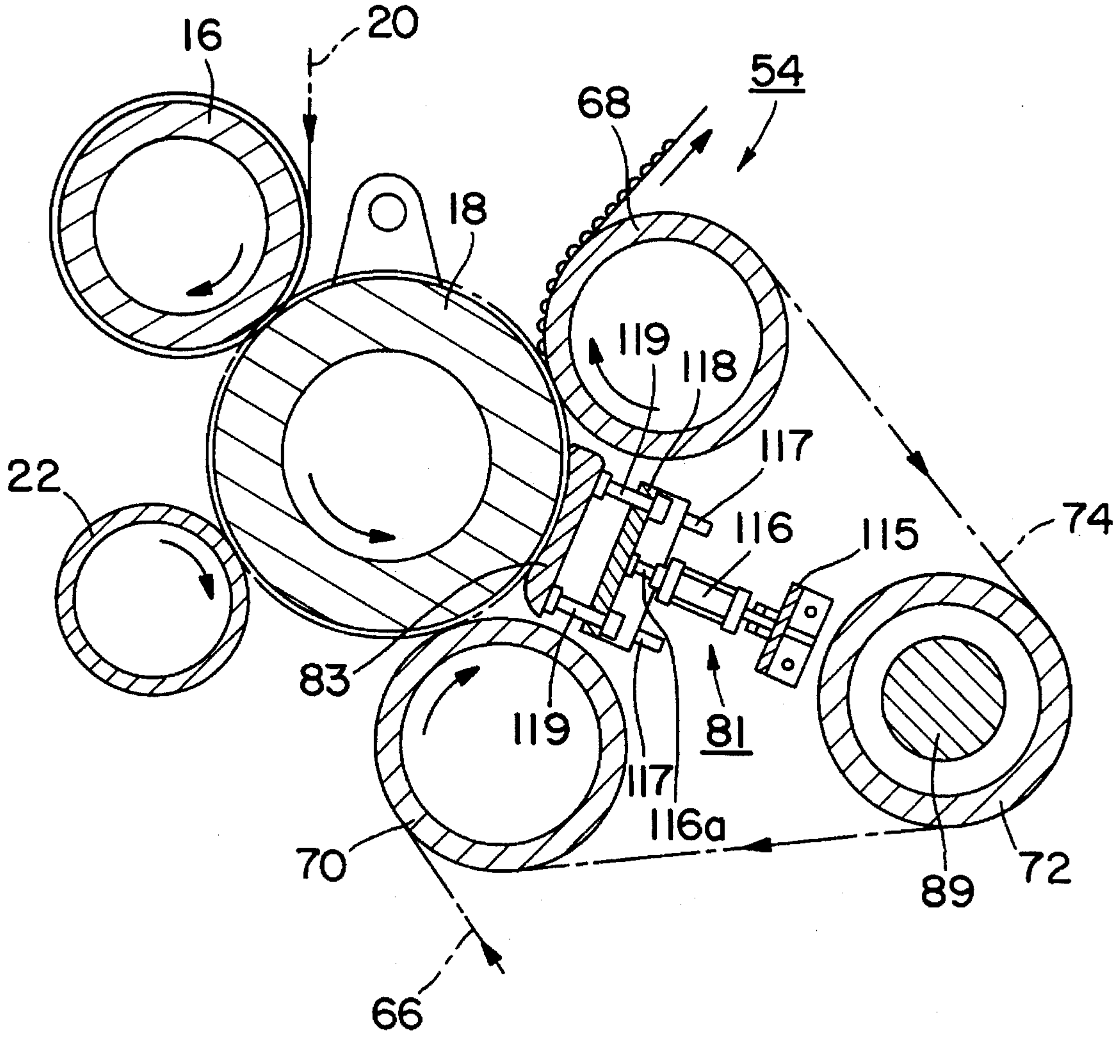
FIG. 12 shows schematically the constitution of still another example of the secondary application mechanism according to the embodiment.

FIG. 12 shows another example of the secondary application mechanism 81, which has a bracket 115 fixed to the main body 14, an air cylinder 116 pivotably supported at the bottom on the bracket 115, and a supporting plate 118 which is slidably disposed on the main body 14 via a pair of guide rails 117 is connected to the piston rod 116*a* of the air cylinder 116. A pressing member 83 is disposed to the supporting plate 118 via a plurality of rods 119 fixed thereon.

Incidentally, the air cylinder 116 is operated under control to move the pressing member 83 between an urging position where the pressing member 83 is brought closer to the lower fluted roll 18 via the supporting plate 118 and a retracted position where the pressing member 83 is spaced from the lower fluted roll 18. Namely, when the supporting plate 118 and the pressing member 83 are shifted to the urging position by operating the air cylinder 116 so as to extend the piston rod 116*a* thereof, the pressing member 83 is brought into press contact with the lower fluted roll 18 via the endless belt 74, liner 66 and corrugating medium 20 under the operation of the cylinder 116.

As the air cylinder 116, a single action cylinder is suitably employed, and the pressing member 83 is brought closer to the lower fluted roll 18 by supplying air to the cylinder; whereas the pressing member 83 is retracted from the lower fluted roll 18 with the aid of a spring disposed in the secondary application mechanism 81 by exhausting air from the cylinder. Alternatively, a double action cylinder may be employed in place of the single action cylinder. Further, the air cylinder 116 may not necessarily be used, and an oil pressure cylinder or a water pressure cylinder may be employed.

Referring to the secondary application mechanism 81 shown in FIG. 11 or 12, the mechanism 81 may be of a single block disposed along the axis of the lower fluted roll 18, or may consist of a plurality of blocks arranged in the axial direction of the lower fluted roll 18 or arranged in rows in the circumferential direction of the lower fluted roll 18. It should be noted here that when the secondary application mechanism 81 consists of a plurality of blocks, the compression spring 112 and cylinder 116 are disposed on each block.

Incidentally, in the single facer shown in the first embodiment, the corrugating medium is brought into press contact with the surface of the lower fluted roll by application of pressure. However, it is also possible to suitably employ a mode to retain the corrugating medium onto the roll surface by the suction force to be exerted from the lower fluted roll.

It should be apparent to those skilled in the art that the present invention may be embodied in many other specific forms without departing from the spirit or scope of the invention. Therefore, the present embodiments and examples are to be considered as illustrative and not restrictive, and the invention is not to be limited to the details given herein, but may be modified within the scope of the appended claims.

What is claimed is:

1. A belt meandering preventing system in a single facer consisting of an upper fluted roll having flutes formed on the circumference thereof; a lower fluted roll, also having on the circumference thereof flutes which are engaged with those of said upper fluted roll to form a predetermined corrugation on a corrugating medium passed between said upper fluted roll and said lower fluted roll; a gluing mechanism for gluing the crests of corrugation in said corrugating medium; and an application mechanism which is disposed adjacent to said lower fluted roll and equipped with an endless belt extended over a plurality of rolls so as to be able to run freely thereby; in which a liner is pressed against the glued crests of corrugation of said corrugating medium fed along the circumference of said lower fluted roll to be pasted with said corrugating medium and form a single-faced corrugated board;

characterized in that a support shaft on which one of said plurality of rolls is rotatably fitted is designed to be swung on one end portion thereof as a fulcrum by operating a drive means.

2. The belt meandering preventing system in a single facer according to claim 1, wherein one of said plurality of rolls over which said endless belt is extended is a tension roll which can apply or release tension to and from said endless belt, said support shaft on which said tension roll is rotatably fitted being designed to be swingable.

3. The belt meandering preventing system in a single facer according to claim 1 or 2, wherein said system is provided with a detector for detecting crosswise meandering of said endless belt, disposed on the running route of an edge of said belt, and control means which receive a detection signal from said detector and controls operation of said drive means.

4. The belt meandering preventing system in a single facer according to claim 1, wherein a screw shaft is screwed into a nut fixed to one end of said support shaft, and a gear which engages with a gear attached to said screw shaft is designed to be rotationally driven in the positive or negative direction by a motor.

* * * * *